(12) United States Patent
Kanzaki et al.

(10) Patent No.: US 12,060,870 B2
(45) Date of Patent: Aug. 13, 2024

(54) VALVE

(71) Applicant: EAGLE INDUSTRY CO., LTD., Tokyo (JP)

(72) Inventors: Toshinori Kanzaki, Tokyo (JP); Wataru Takahashi, Tokyo (JP); Masahiro Hayama, Tokyo (JP); Kohei Fukudome, Tokyo (JP); Keigo Shirafuji, Tokyo (JP)

(73) Assignee: EAGLE INDUSTRY CO., LTD. (JP)

( * ) Notice: Subject to any disclaimer, the term of this patent is extended or adjusted under 35 U.S.C. 154(b) by 0 days.

(21) Appl. No.: 18/022,465

(22) PCT Filed: Aug. 17, 2021

(86) PCT No.: PCT/JP2021/030007
§ 371 (c)(1),
(2) Date: Feb. 21, 2023

(87) PCT Pub. No.: WO2022/044880
PCT Pub. Date: Mar. 3, 2022

(65) Prior Publication Data
US 2023/0313789 A1 Oct. 5, 2023

(30) Foreign Application Priority Data
Aug. 24, 2020 (JP) .................. 2020-140995

(51) Int. Cl.
*F16K 1/44* (2006.01)
*F04B 27/18* (2006.01)

(52) U.S. Cl.
CPC ............ *F04B 27/1804* (2013.01); *F16K 1/44* (2013.01)

(58) Field of Classification Search
CPC ...... F04B 27/1804; F16K 1/44; F16K 31/406; F16K 31/0668
See application file for complete search history.

(56) References Cited

U.S. PATENT DOCUMENTS

| 1,614,002 A | 1/1927 | Horton ................. A62C 35/605 |
| 2,267,515 A | 12/1941 | Wilcox ............... F16K 31/0627 |

(Continued)

FOREIGN PATENT DOCUMENTS

| CN | 110260001 | 9/2019 | .......... F16K 15/016 |
| CN | 111279076 | 6/2020 | .............. F04B 27/18 |

(Continued)

OTHER PUBLICATIONS

International Search Report and Written Opinion and International Preliminary Report on Patentability issued in PCT/JP2021/027769, dated Sep. 7, 2021, 24 pages.

(Continued)

*Primary Examiner* — P. Macade Nichols
(74) *Attorney, Agent, or Firm* — HAYES SOLOWAY P.C.

(57) ABSTRACT

A valve includes: a valve housing provided with a primary pressure port and a secondary pressure port; a valve body configured to be driven by a solenoid; a valve seat on which the valve body is seated; and a spring that urges the valve body in a valve opening direction. The valve seat includes a first valve seat and a second valve seat disposed on a radially inner side of the first valve seat. The second valve seat is (Continued)

configured for moving in a direction toward the valve body due to a differential pressure between a primary pressure and a secondary pressure.

13 Claims, 6 Drawing Sheets

(56) References Cited

U.S. PATENT DOCUMENTS

| | | | | |
|---|---|---|---|---|
| 3,360,304 | A | 12/1967 | Adams | B61K 7/12 |
| 3,483,888 | A | 12/1969 | Hugo | F16K 15/046 |
| 4,085,921 | A | 4/1978 | Ueda et al. | F16K 31/06 |
| 4,364,615 | A | 12/1982 | Euler | F16C 27/04 |
| 4,579,145 | A | 4/1986 | Leiber | F16H 61/0251 |
| 4,615,358 | A | 10/1986 | Hammond | F15B 13/0402 |
| 4,895,192 | A | 1/1990 | Mortenson | F01M 11/04 |
| 4,917,150 | A | 4/1990 | Koch | F16K 31/0606 |
| 4,979,542 | A | 12/1990 | Mesenich | F02M 47/027 |
| 4,998,559 | A | 3/1991 | McAuliffe | F16H 61/0251 |
| 5,060,695 | A | 10/1991 | McCabe | G05D 16/2024 |
| 5,217,047 | A | 6/1993 | McCabe | F16H 16/0251 |
| 5,263,694 | A | 11/1993 | Smith | B60G 15/068 |
| 5,702,235 | A | 12/1997 | Hirota | F04B 27/1804 |
| 5,778,932 | A | 7/1998 | Alexander | G05D 16/2024 |
| 6,010,312 | A | 1/2000 | Suitou | F04B 27/1804 |
| 6,155,391 | A | 12/2000 | Kashiwagi et al. | F16F 9/348 |
| 6,161,585 | A | 12/2000 | Kolchinsky | F05D 16/2024 |
| 6,257,836 | B1 | 7/2001 | Ota et al. | 417/222.02 |
| 6,361,283 | B1 | 3/2002 | Ota | F04B 27/1084 |
| 6,481,976 | B2 | 11/2002 | Kimura | F04B 27/1804 |
| 7,040,595 | B2 | 5/2006 | Hirota | F16K 31/02 |
| 7,533,687 | B2 | 5/2009 | Uemura | F16K 27/048 |
| 7,726,949 | B2 | 6/2010 | Taguchi | F04B 1/26 |
| 8,021,124 | B2 | 9/2011 | Umemura | F04B 27/1804 |
| 8,079,827 | B2 | 12/2011 | Iwa | F04B 27/1804 |
| 8,225,818 | B1 | 7/2012 | Stephens | F15B 13/0442 |
| 8,651,826 | B2 | 2/2014 | Futakuchi | F04B 27/1804 |
| 9,022,346 | B2 | 5/2015 | Najmolhoda | F16K 31/0613 |
| 9,027,598 | B2 | 5/2015 | Schneider | F16K 31/0613 |
| 9,132,714 | B2 | 9/2015 | Futakuchi | F04B 27/1804 |
| 9,297,373 | B2 | 3/2016 | Bagagli | F16K 15/026 |
| 9,400,027 | B2 | 7/2016 | Imaizumi | F16F 1/32 |
| 9,453,518 | B2 | 9/2016 | Schulz | F15B 13/043 |
| 9,581,149 | B2 | 2/2017 | Ota et al. | F04B 27/1804 |
| 9,581,150 | B2 | 2/2017 | Ota et al. | F04B 27/1804 |
| 9,732,874 | B2 | 8/2017 | Saeki | F16K 31/0603 |
| 9,874,286 | B2 | 1/2018 | Bagagli | F16K 15/12 |
| 10,113,539 | B2 | 10/2018 | Sugamura | F04B 27/1804 |
| 10,519,944 | B2 | 12/2019 | Taguchi | F04B 27/1804 |
| 10,557,463 | B2 | 2/2020 | Sugamura | F04B 27/1804 |
| 10,690,125 | B2 | 6/2020 | Hayama | F04B 27/18 |
| 10,784,804 | B2 | 9/2020 | Sasaki | H02P 25/022 |
| 10,837,431 | B2 | 11/2020 | Tonegawa | F04B 49/22 |
| 11,085,431 | B2 | 8/2021 | Fukudome et al. | F16K 31/06 |
| 2001/0003573 | A1 | 6/2001 | Kimura et al. | 417/222.2 |
| 2002/0134444 | A1 | 9/2002 | Isobe | F16K 27/041 |
| 2003/0145615 | A1 | 8/2003 | Sasaki | F16K 31/0637 |
| 2003/0197141 | A1 | 10/2003 | Kajitani | F16L 47/00 |
| 2003/0202885 | A1 | 10/2003 | Taguchi | F04B 49/00 |
| 2004/0045305 | A1 | 3/2004 | Murase | F25B 49/022 |
| 2004/0165994 | A1 | 8/2004 | Umemura | F04B 27/1804 |
| 2005/0076959 | A1 | 4/2005 | Yamamoto | F16K 31/0624 |
| 2005/0151310 | A1 | 7/2005 | Rodeffer | F16F 1/32 |
| 2005/0163624 | A1* | 7/2005 | Taguchi | F04B 27/1804 |
| | | | | 417/222.1 |
| 2007/0214814 | A1 | 9/2007 | Umemura et al. | |
| 2007/0264134 | A1 | 11/2007 | Hirota | F04B 27/1804 |
| 2008/0138213 | A1 | 6/2008 | Umemura et al. | 417/222.2 |
| 2008/0175727 | A1 | 7/2008 | Umemura et al. | F04B 49/22 |
| 2009/0108221 | A1 | 4/2009 | Umemura et al. | 251/129.15 |
| 2009/0114871 | A1 | 5/2009 | Iwa | F04B 27/14 |
| 2009/0183786 | A1 | 7/2009 | Iwa | 137/487.5 |
| 2009/0256091 | A1 | 10/2009 | Nordstrom | F16K 31/0613 |
| 2010/0019406 | A1 | 1/2010 | Shoji et al. | F16K 1/34 |
| 2010/0282991 | A1 | 11/2010 | Okamoto | F16K 31/02 |
| 2011/0041941 | A1 | 2/2011 | Sonsterod | F16K 15/14 |
| 2011/0061749 | A1 | 3/2011 | Okamoto | F16K 31/0655 |
| 2011/0089352 | A1 | 4/2011 | Morgan | F16K 11/0716 |
| 2011/0203888 | A1 | 8/2011 | Sonsterod | F16F 9/32 |
| 2012/0056113 | A1 | 3/2012 | Tano | F04B 27/1804 |
| 2012/0198992 | A1 | 8/2012 | Futakuchi et al. | 91/505 |
| 2012/0198993 | A1 | 8/2012 | Fukudome | 91/505 |
| 2012/0211686 | A1 | 8/2012 | Okamoto | F16K 31/0655 |
| 2013/0291963 | A1 | 11/2013 | Futakuchi et al. | 137/487.5 |
| 2014/0099214 | A1 | 4/2014 | Fukudome | 417/222.2 |
| 2014/0130916 | A1 | 5/2014 | Saeki | F16K 31/0613 |
| 2014/0294632 | A1 | 10/2014 | Kondo et al. | 417/434 |
| 2014/0369862 | A1 | 12/2014 | Ota et al. | F04B 27/1804 |
| 2015/0004010 | A1* | 1/2015 | Saeki | F04B 27/1804 |
| | | | | 417/213 |
| 2015/0021131 | A1 | 1/2015 | Wootten | F16F 9/348 |
| 2015/0027573 | A1 | 1/2015 | Ochiai | F15B 13/0402 |
| 2015/0044067 | A1 | 2/2015 | Ota et al. | F04B 27/1804 |
| 2015/0068628 | A1 | 3/2015 | Iwa | 137/625.65 |
| 2015/0104334 | A1 | 4/2015 | Ota et al. | F04B 27/1804 |
| 2015/0275874 | A1 | 10/2015 | Ota | F04B 27/1804 |
| 2015/0345655 | A1 | 12/2015 | Higashidozono | 137/624.27 |
| 2016/0053755 | A1 | 2/2016 | Taguchi | F04B 49/22 |
| 2016/0290326 | A1 | 10/2016 | Sugamura | F04B 27/1804 |
| 2017/0284562 | A1 | 10/2017 | Hayama | F16K 41/00 |
| 2018/0156345 | A1 | 6/2018 | Kanda | F15B 13/0431 |
| 2018/0187793 | A1 | 7/2018 | Futakuchi | F04B 39/08 |
| 2018/0291888 | A1 | 10/2018 | Tonegawa et al. | F04B 49/22 |
| 2019/0162175 | A1 | 5/2019 | Higashidozono | F04B 27/18 |
| 2020/0032781 | A1 | 1/2020 | Higashidozono | F16K 31/0624 |
| 2020/0088178 | A1 | 3/2020 | Fukudome et al. | F16K 31/06 |
| 2020/0309105 | A1 | 10/2020 | Hayama et al. | F04B 27/18 |
| 2020/0318624 | A1 | 10/2020 | Hayama | F04B 27/18 |
| 2020/0325881 | A1 | 10/2020 | Hayama et al. | F04B 27/18 |
| 2020/0332786 | A1 | 10/2020 | Hayama | F04B 27/1804 |
| 2020/0362974 | A1 | 11/2020 | Hayama et al. | F16K 11/24 |
| 2020/0370545 | A1 | 11/2020 | Hayama et al. | F04B 27/18 |
| 2021/0372396 | A1 | 12/2021 | Kurihara | G05D 7/0635 |
| 2021/0404570 | A1 | 12/2021 | Hayama et al. | F16K 17/04 |

FOREIGN PATENT DOCUMENTS

| | | | | |
|---|---|---|---|---|
| CN | 111316028 | | 6/2020 | F16K 31/06 |
| CN | 111417780 | | 7/2020 | F04B 27/18 |
| EP | 2594794 | | 5/2013 | F04B 27/18 |
| EP | 3296599 | | 3/2018 | F16K 1/34 |
| EP | 3366957 | | 8/2018 | F16K 1/34 |
| EP | 3726054 | | 10/2020 | F04B 27/18 |
| JP | 5682358 | | 7/1981 | G03B 15/00 |
| JP | 5740945 | | 8/1982 | B21B 39/14 |
| JP | 5346276 | | 12/1993 | F25B 41/96 |
| JP | 626454 | | 2/1994 | F04B 27/08 |
| JP | H0711313 | | 2/1995 | F16K 1/34 |
| JP | H8159320 | | 6/1996 | F16K 31/04 |
| JP | H10220926 | | 8/1998 | F25B 41/06 |
| JP | 11287281 | | 10/1999 | F16F 9/348 |
| JP | 200020763 | | 8/2000 | F16K 31/06 |
| JP | 2000304152 | | 11/2000 | F16D 48/02 |
| JP | 2001012534 | | 1/2001 | F16F 9/46 |
| JP | 2001153495 | | 6/2001 | F16K 31/06 |
| JP | 2001153498 | | 6/2001 | F16K 31/06 |
| JP | 2001165055 | | 6/2001 | F04B 27/14 |
| JP | 2002216803 | | 8/2002 | H01M 8/02 |
| JP | 2003004160 | | 1/2003 | F16K 31/04 |
| JP | 2003301772 | | 10/2003 | |
| JP | 2003314745 | | 11/2003 | F16K 51/02 |
| JP | 2003322086 | | 11/2003 | F04B 49/00 |
| JP | 2004003468 | | 1/2004 | F04B 27/14 |
| JP | 2004101163 | | 4/2004 | F25B 41/06 |
| JP | 2005307817 | | 11/2005 | F04B 27/14 |
| JP | 2005351605 | | 12/2005 | F16K 1/38 |
| JP | 2006153204 | | 6/2006 | F16K 31/04 |
| JP | 2007247512 | | 9/2007 | F04B 27/14 |
| JP | 2008157031 | | 7/2008 | F04B 27/14 |
| JP | 2008190574 | | 8/2008 | F16K 31/06 |
| JP | 2009030752 | | 2/2009 | F16K 31/06 |
| JP | 2009115204 | | 5/2009 | F16K 31/04 |
| JP | 2009221965 | | 10/2009 | F04B 27/14 |

(56) References Cited

FOREIGN PATENT DOCUMENTS

| | | | |
|---|---|---|---|
| JP | 2009275550 | 11/2009 | ............. F04B 49/00 |
| JP | 2010019406 | 1/2010 | ............. F16K 31/04 |
| JP | 2011501798 | 1/2011 | ............. F16K 15/14 |
| JP | 2011525962 | 9/2011 | ................ F16F 9/32 |
| JP | 4822735 | 11/2011 | ............. A43B 23/24 |
| JP | 2012144986 | 8/2012 | ............. F04B 27/14 |
| JP | 2012211579 | 11/2012 | ............. F04B 27/14 |
| JP | 2013024135 | 2/2013 | ............. F04B 27/14 |
| JP | 5167121 | 3/2013 | ............. F04B 27/14 |
| JP | 2013100915 | 5/2013 | ............. F15K 31/06 |
| JP | 2014080927 | 5/2014 | ............. F04B 27/16 |
| JP | 2014092207 | 5/2014 | ............. F16K 31/06 |
| JP | 2014095463 | 5/2014 | ............. F16K 31/06 |
| JP | 2014194180 | 10/2014 | ............. F04B 27/14 |
| JP | 2015075054 | 4/2015 | ............. F04B 27/14 |
| JP | 20151168 | 5/2015 | ............. F04B 27/14 |
| JP | 2015137546 | 7/2015 | ............. F04B 27/14 |
| JP | 2015178795 | 10/2015 | ............. F04B 27/14 |
| JP | 5983539 | 8/2016 | ............. F04B 27/18 |
| JP | 2016196825 | 11/2016 | ............. F04B 27/18 |
| JP | 2016196876 | 11/2016 | ............. F04B 27/18 |
| JP | 2016205404 | 12/2016 | ............. F04B 27/14 |
| JP | 6135521 | 5/2017 | ............. F04B 27/18 |
| JP | 2017089832 | 5/2017 | ............. F16K 31/06 |
| JP | 2017180525 | 10/2017 | ............. F16K 31/04 |
| JP | 2018015739 | 2/2018 | ................ C02F 1/46 |
| JP | 2018035840 | 5/2018 | |
| JP | 2018115684 | 7/2018 | ............. B60G 17/08 |
| JP | 2018135954 | 8/2018 | ............. F16K 31/06 |
| JP | 2018179087 | 11/2018 | ............. F16K 31/06 |
| JP | 2019131725 | 8/2019 | |
| JP | 2019138473 | 8/2019 | ................ F16K 1/36 |
| JP | 2019167982 | 10/2019 | ................ F16K 1/38 |
| JP | 2020041606 | 3/2020 | ................ F16K 1/44 |
| WO | WO2006090760 | 8/2006 | ............. F04B 27/18 |
| WO | WO2007119380 | 10/2007 | ............. F04B 27/14 |
| WO | WO2009025298 | 2/2009 | ............. F16K 31/06 |
| WO | WO2011114841 | 9/2011 | ............. F04B 27/14 |
| WO | WO2011132438 | 10/2011 | ............. F16K 31/06 |
| WO | WO2012077439 | 6/2012 | ............. F04B 27/14 |
| WO | WO2014119594 | 8/2014 | ............. F04B 27/14 |
| WO | WO2014148367 | 9/2014 | ............. F16K 31/06 |
| WO | WO2018124156 | 7/2018 | ............. F16K 31/06 |
| WO | WO2019131482 | 7/2019 | ............. F04B 27/18 |
| WO | WO2020110925 | 11/2019 | ............. F04B 27/18 |

OTHER PUBLICATIONS

International Search Report and Written Opinion and International Preliminary Report on Patentability issued in PCT/JP2021/027762, dated Oct. 5, 2021, 20 pages.

International Search Report and Written Opinion and International Preliminary Report on Patentability issued in PCT/JP2021/027766, dated Sep. 7, 2021, 24 pages.

International Search Report and Written Opinion and International Preliminary Report on Patentability issued in PCT/JP2021/027770, dated Oct. 5, 2021, 20 pages.

International Search Report and Written Opinion and International Preliminary Report on Patentability issued in PCT/JP2021/027772, dated Sep. 21, 2021, 24 pages.

International Search Report and Written Opinion and International Preliminary Report on Patentability issued in PCT/JP2021/027767, dated Sep. 7, 2021, 22 pages.

International Search Report and Written Opinion and International Preliminary Report on Patentability issued in PCT/JP2021/030007, dated Nov. 2, 2021, 18 pages.

International Search Report and Written Opinion and International Preliminary Report on Patentability issued in PCT/JP2021/034996, dated Dec. 12, 2021, 18 pages.

International Search Report and Written Opinion and International Preliminary Report on Patentability issued in PCT/JP2021/034990, dated Oct. 19, 2021, 18 pages.

International Search Report and Written Opinion and International Preliminary Report on Patentability issued in PCT/JP2021/034995, dated Dec. 14, 2021, 16 pages.

U.S. Appl. No. 18/019,057, filed Jan. 31, 2023, Fukudome et al.
U.S. Appl. No. 18/019,230, filed Feb. 1, 2023, Fukudome et al.
U.S. Appl. No. 18/019,060, filed Jan. 31, 2023, Kanzaki et al.
U.S. Appl. No. 18/019,066, filed Jan. 31, 2023, Kanzaki et al.
U.S. Appl. No. 18/017,825, filed Jan. 24, 2023, Hayama et al.
U.S. Appl. No. 18/017,824, filed Jan. 24, 2023, Ejima et al.
U.S. Appl. No. 18/029,063, filed Mar. 28, 2023, Higashidozono et al.
U.S. Appl. No. 18/029,065, filed Mar. 28, 2023, Higashidozono.

International Search Report and Written Opinion and International Preliminary Report on Patentability issued in PCT/JP2022/012340, dated May 31, 2022, 24 pages.

* cited by examiner

VALVE

TECHNICAL FIELD

The present invention relates to a valve that variably controls a working fluid, for example, to a capacity control valve that controls a discharge amount of a variable displacement compressor used for an air conditioning system of an automobile according to pressure.

BACKGROUND ART

A variable displacement compressor used for an air conditioning system of an automobile, etc. includes a rotating shaft, a swash plate, compressing pistons, etc. The rotating shaft is rotationally driven by an engine, the swash plate is coupled to the rotating shaft in such a manner that a tilt angle is variable, and the compressing pistons are coupled to the swash plate. The variable displacement compressor changes a stroke amount of the pistons by changing the tilt angle of the swash plate, and thus controls a discharge amount of fluid. This tilt angle of the swash plate can be continuously changed by appropriately controlling pressure in a control chamber while utilizing a suction pressure Ps of a suction chamber that suctions the fluid, a discharge pressure Pd of a discharge chamber that discharges the fluid pressurized by the pistons, and a control pressure Pc of the control chamber that houses the swash plate, by means of a capacity control valve to be driven to open and close by electromagnetic force.

At the time of continuously driving the variable displacement compressor, the energization of the capacity control valve is controlled by a control computer, and a valve body is moved in an axial direction by electromagnetic force generated in a solenoid. Accordingly, normal control is performed in which a valve provided between a discharge port through which a discharge fluid of the discharge pressure Pd passes and a control port through which a control fluid of the control pressure Pc passes is opened and closed to adjust the control pressure Pc of the control chamber of the variable displacement compressor.

During normal control of the capacity control valve, the pressure of the control chamber in the variable displacement compressor is appropriately controlled, and the tilt angle of the swash plate with respect to the rotating shaft is continuously changed to change the stroke amount of the pistons and to control the amount of discharge of the fluid to the discharge chamber, so that the air conditioning system is adjusted to have a target cooling capacity.

In addition, there is a capacity control valve that opens and closes a poppet valve provided between the control port and a suction port, to control a flow rate of the fluid flowing from the control port to the suction port (refer to Patent Citation 1). Such a capacity control valve controls the control pressure Pc of the control chamber of the variable displacement compressor using a pressure difference between the control pressure Pc that is a primary pressure and the suction pressure Ps that is a secondary pressure lower than the control pressure Pc. Incidentally, the control chamber of the variable displacement compressor communicates with the discharge chamber of the variable displacement compressor via an orifice, and the discharge pressure Pd of high pressure is constantly supplied to the control chamber through the orifice to adjust the control pressure Pc.

CITATION LIST

Patent Literature

Patent Citation 1: JP 2015-075054 A (PAGES 8 to 10 and FIG. 2)

SUMMARY OF INVENTION

Technical Problem

The capacity control valve as in Patent Citation 1 has a poppet valve structure, and when the valve is closed, a force that the fluid in a flow passage acts on a valve body in a direction opposite a driving force of a solenoid increases as the valve opening degree becomes narrower. Particularly, in a state where the pressure of the fluid is high, the force that a valve body receives from the fluid is strong, and a driving force to cope with this state is required by the solenoid.

The present invention is conceived in view of such a problem, and an object of the present invention is to provide a valve that can be closed with a small driving force.

Solution to Problem

In order to solve the foregoing problem, a valve according to the present invention includes: a valve housing provided with a primary pressure port and a secondary pressure port; a valve body configured to be driven by a drive source; and a valve seat on which the valve body is seated, wherein the valve seat includes a first valve seat and a second valve seat disposed on a radially inner side of the first valve seat, the second valve seat being configured for moving in a direction toward the valve body due to a differential pressure between a primary pressure and a secondary pressure. According to the aforesaid feature of the present invention, the second valve seat is moved in the direction toward the valve body by the differential pressure between the primary pressure and the secondary pressure, so that the valve diameter when the valve is closed can be reduced. Accordingly, a drag force received from the primary pressure decreases, so that the valve body can be closed with a small driving force.

It may be preferable that a movable body in which the second valve seat is formed has a pressure-receiving surface that constantly receives the secondary pressure. According to this preferable configuration, since the differential pressure can constantly act on the movable body, responsiveness of the movable body to the differential pressure can be improved.

It may be preferable that the movable body is urged in a direction away from the valve body by an urging member. According to this preferable configuration, when the differential pressure acting on the movable body is small, the movable body can be reliably separated from the valve body.

It may be preferable that a fluid of the primary pressure and a fluid of the secondary pressure are allowed to flow to a space partially defined by the pressure-receiving surface. According to this preferable configuration, since the primary pressure is also supplied to the space that the pressure-receiving surface receiving the secondary pressure faces, the differential pressure acting on the movable body can be adjusted according to the primary pressure, and the responsiveness of the movable body can be improved.

It may be preferable that the urging member is disposed in the space. According to this preferable configuration, the movable body and the valve body can be independently operated, and the responsiveness of the movable body can be improved.

It may be preferable that the movable body includes a closing portion configured for closing a second primary pressure port that allows the fluid of the primary pressure to flow to the space when the valve body is seated on the second valve seat to close the valve. According to this preferable configuration, a leakage of the fluid from a primary pressure side to a secondary pressure side when the valve is closed can be prevented.

It may be preferable that the second primary pressure port is formed by a tapered nozzle that is reduced in flow passage cross-sectional area toward a downstream side. According to this preferable configuration, when the fluid passing through the second primary pressure port flows at a subsonic speed, the fluid passing through the second primary pressure port from the primary pressure side increases in flow speed, and the pressure of the fluid supplied to the space decreases, so that the differential pressure acting on the movable body is adjusted to increase. Accordingly, the movable body can easily approach the valve body.

It may be preferable that the second primary pressure port is formed by a divergent nozzle that is increased in flow passage cross-sectional area toward a downstream side. According to this preferable configuration, when the fluid passing through the second primary pressure port flows at a supersonic speed, the fluid passing through the second primary pressure port from the primary pressure side increases in flow speed, and the pressure of the fluid supplied to the space decreases, so that the differential pressure acting on the movable body is adjusted to increase. Accordingly, the movable body can easily approach the valve body.

DESCRIPTION OF EMBODIMENTS

Modes for carrying out a valve according to the present invention will be described below based on embodiments.

Incidentally, in the embodiments, a capacity control valve will be described as an example, but the present invention is also applicable to other uses.

First Embodiment

Figure 1:
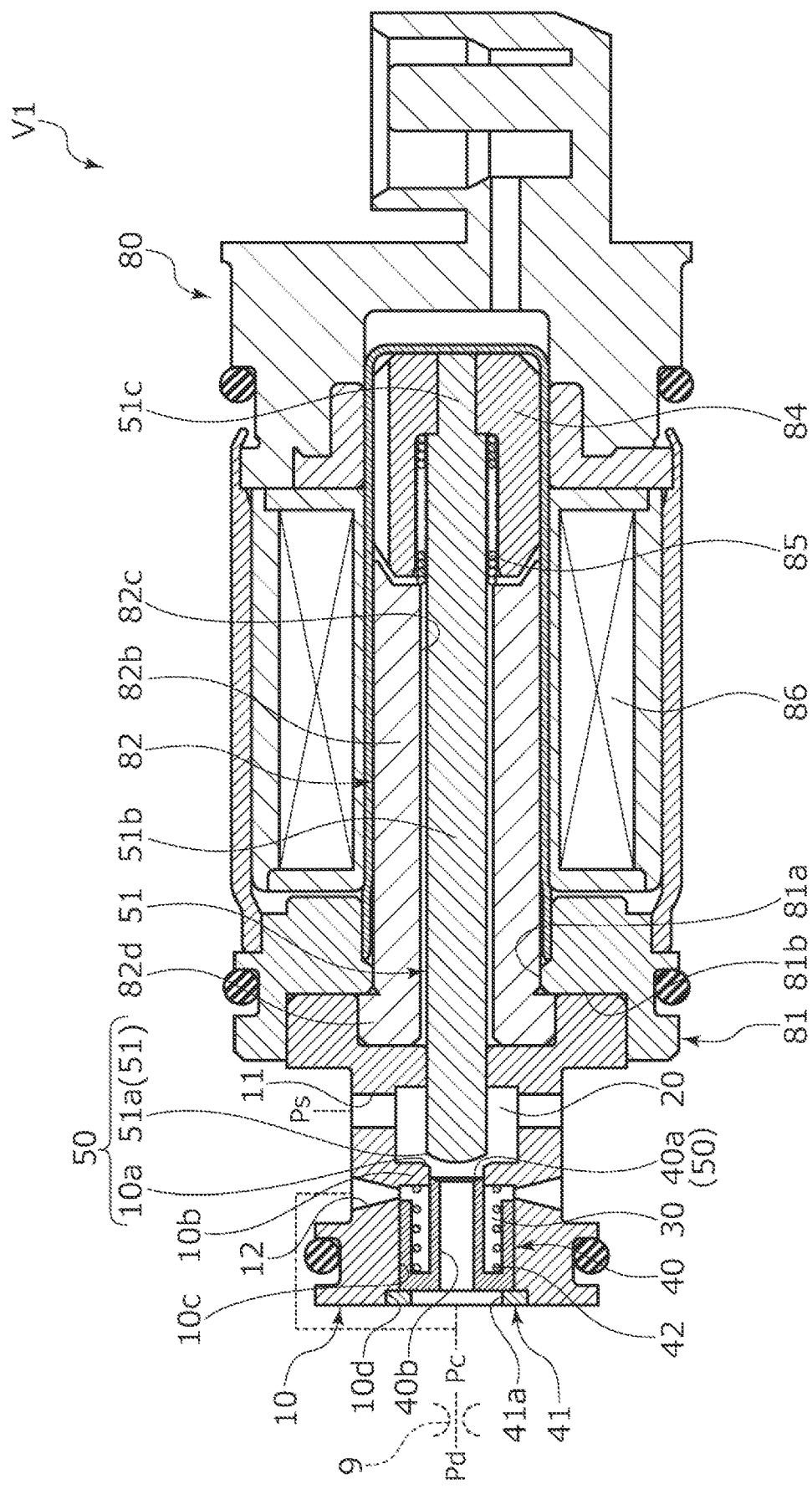
FIG. 1 is a cross-sectional view showing a state where a CS valve is opened in a non-energized state of a capacity control valve as a valve according to a first embodiment of the present invention.

A capacity control valve as a valve according to a first embodiment of the present invention will be described with reference to FIGS. 1 to 5. Hereinafter, a description will be given based on the assumption that the left and right sides when seen from the front side of FIG. 1 are left and right sides of the capacity control valve. In detail, a description will be given based on the assumption that a left side of the drawing sheet on which a valve housing 10 is disposed is a left side of the capacity control valve and a right side of the drawing sheet on which a solenoid 80 that is a drive source is disposed is a right side of the capacity control valve.

The capacity control valve according to the present invention is assembled into a variable displacement compressor (not shown) used for an air conditioning system of an automobile, etc., and by variably controlling the pressure of a working fluid (hereinafter, simply referred to as a "fluid") that is a refrigerant, controls the discharge amount of the variable displacement compressor to adjust the air conditioning system to have a desired cooling capacity.

First, the variable displacement compressor will be described. The variable displacement compressor includes a casing including a discharge chamber, a suction chamber, a control chamber, and a plurality of cylinders. Incidentally, the variable displacement compressor is provided with a communication passage that provides direct communication between the discharge chamber and the control chamber, and the communication passage is provided with a fixed orifice 9 that balances the pressures of the discharge chamber and the control chamber (refer to FIG. 1).

In addition, the variable displacement compressor includes a rotating shaft, a swash plate, and a plurality of pistons. The rotating shaft is rotationally driven by an engine (not shown) installed outside the casing. The swash plate is coupled to the rotating shaft so as to be tiltable by a hinge mechanism in the control chamber. The plurality of pistons are coupled to the swash plate and are reciprocatably fitted in the respective cylinders. The variable displacement compressor continuously changes the tilt angle of the swash plate by appropriately controlling pressure in the control chamber while utilizing a suction pressure Ps of the suction chamber that suctions the fluid, a discharge pressure Pd of the discharge chamber that discharges the fluid pressurized by the pistons, and a control pressure Pc of the control chamber that houses the swash plate, by means of a capacity control valve V1 to be driven to open and close by electromagnetic force, and thus changes the stroke amount of the pistons to control the discharge amount of the fluid.

As shown in FIG. 1, the capacity control valve V1 of the first embodiment assembled into the variable displacement compressor controls the fluid flowing out from the control chamber that is a primary pressure side to the suction chamber that is a secondary pressure side by performing opening and closing control of a CS valve 50 in the capacity control valve V1 through adjusting an electric current that energizes a coil 86 forming the solenoid 80, and thus variably controls the control pressure Pc in the control chamber. Incidentally, a discharge fluid of the discharge pressure Pd of the discharge chamber is constantly supplied to the control chamber via the fixed orifice 9, and the CS valve 50 in the capacity control valve V1 is closed, so that the control pressure Pc in the control chamber is increased.

In the capacity control valve V1 of the first embodiment, the CS valve 50 has a poppet valve structure including a CS valve body 51 as a valve body, a first valve seat 10a, and a second valve seat 40a. The first valve seat 10a is formed at an annular protrusion 10b protruding from an inner peripheral surface of the valve housing 10 to a radially inner side. The second valve seat 40a is formed at an axially right end of a movable body 40 that is moved in an axial direction on a radially inner side of the first valve seat 10a by a differential pressure. A contact portion 51a formed at an axially left end of the CS valve body 51 comes into contact with and separates from the first valve seat 10a or the second valve seat 40a in the axial direction to open and close the CS valve 50. The first valve seat 10a and the second valve seat 40a are the valve seats of the present invention.

Next, a structure of the capacity control valve V1 will be described. As shown in FIG. 1, the capacity control valve V1 mainly includes the valve housing 10, the CS valve body 51, the movable body 40, and the solenoid 80. The valve housing 10 is made of a metallic material. The CS valve body 51 and the movable body 40 each are disposed inside the valve housing 10 so as to be reciprocatable in the axial direction. The solenoid 80 is connected to the valve housing 10 to exert a driving force on the CS valve body 51.

As shown in FIG. 1, the CS valve body 51 is made of a metallic material or a resin material. In addition, the CS valve body 51 includes a large-diameter portion 51b that is a columnar body having a constant cross section, and a small-diameter portion 51c extending from a radially inner side of an axially right end of the large-diameter portion 51b to the right in the axial direction, and also serves as a rod that is disposed through the coil 86 of the solenoid 80.

The contact portion 51a is formed on an axially left end surface of the CS valve body 51, namely, on an axially left end surface of the large-diameter portion 51b. The contact portion 51a bulges toward the first valve seat 10a and the second valve seat 40a and is formed in a curved shape in a cross-sectional view. In detail, the curved shape of the contact portion 51a is formed by a part of a spherical surface having a constant radius of curvature. Incidentally, the curved shape of the contact portion 51a may not be formed by a part of a spherical surface having a constant radius of curvature as long as the contact portion 51a can be seated on the first valve seat 10a and on the second valve seat 40a.

As shown in FIG. 1, the solenoid 80 mainly includes a casing 81, a center post 82, the CS valve body 51, a movable iron core 84, a coil spring 85 as a spring, and the coil 86 for excitation. The casing 81 includes an opening portion 81a that is open to the left in the axial direction. The center post 82 has a substantially cylindrical shape and is inserted into the opening portion 81a of the casing 81 from the left in the axial direction to be disposed between a radially inner side of the casing 81 and a radially inner side of the valve housing 10. The CS valve body 51 is inserted into the center post 82 to be reciprocatable in the axial direction, and an axially left end portion of the CS valve body 51 is disposed inside the valve housing 10. An axially right end portion of the CS valve body 51 is inserted and fixed to the movable iron core 84. The coil spring 85 is provided between the center post 82 and the movable iron core 84 to urge the movable iron core 84 to the right in the axial direction, which is a valve opening direction of the CS valve 50. The coil 86 is wound on an outer side of the center post 82 with a bobbin interposed therebetween.

As shown in FIG. 1, the annular protrusion 10b protruding from the inner peripheral surface of the valve housing 10 to the radially inner side is formed at a substantially axially center portion of the valve housing 10. The first valve seat 10a having a tilted shape in a cross-sectional view is formed at the annular protrusion 10b. The first valve seat 10a is continuous from an annular side surface on an axially right side of the annular protrusion 10b to the radially inner side and is gradually reduced in diameter toward the left in the axial direction. Namely, the first valve seat 10a is formed of a tapered surface that is a tilted surface having a linear shape in a cross-sectional view and extending in a circumferential direction.

In addition, a Ps port 11 as a secondary pressure port is formed in the valve housing 10. The Ps port 11 penetrates through the valve housing 10 in a radial direction on the axially right side of the annular protrusion 10b and communicates with the suction chamber of the variable displacement compressor. In addition, a second Pc port 12 as a second primary pressure port is formed in the valve housing 10. The second Pc port 12 penetrates through the valve housing 10 in the radial direction on an axially left side of the annular protrusion 10b and communicates with the control chamber of the variable displacement compressor. The second Pc port 12 has a tapered nozzle shape that is reduced in flow passage cross-sectional area toward a downstream side (dA<0).

In addition, a recessed portion 10c is formed on an axially left side of the valve housing 10. The movable body 40 having a flanged cylindrical shape is inserted into the recessed portion 10c from the left in the axial direction. Incidentally, a stopper 41 having a rectangular shape in a cross-sectional view is press-fitted and fixed to a step portion 10d having an annular shape that is formed at an edge on an axially left side of the recessed portion 10c of an axially left end portion of the valve housing 10, and a through-hole 41a penetrating through the stopper 41 forms a first Pc port as a primary pressure port communicating with the control chamber of the variable displacement compressor.

A valve chamber 20 is formed on the axially right side of the annular protrusion 10b inside the valve housing 10. The contact portion 51a of the CS valve body 51 is disposed in the valve chamber 20 so as to be reciprocatable in the axial direction. In addition, the Ps port 11 extends from an outer peripheral surface of the valve housing 10 in a radially inward direction to communicate with the valve chamber 20.

In addition, the movable body 40 is inserted into the recessed portion 10c formed on the axially left side of the annular protrusion 10b, so that a space 30 having an annular shape is formed inside the valve housing 10. In addition, the second Pc port 12 extends from the outer peripheral surface of the valve housing 10 in the radially inward direction to communicate with the space 30.

Figure 2:
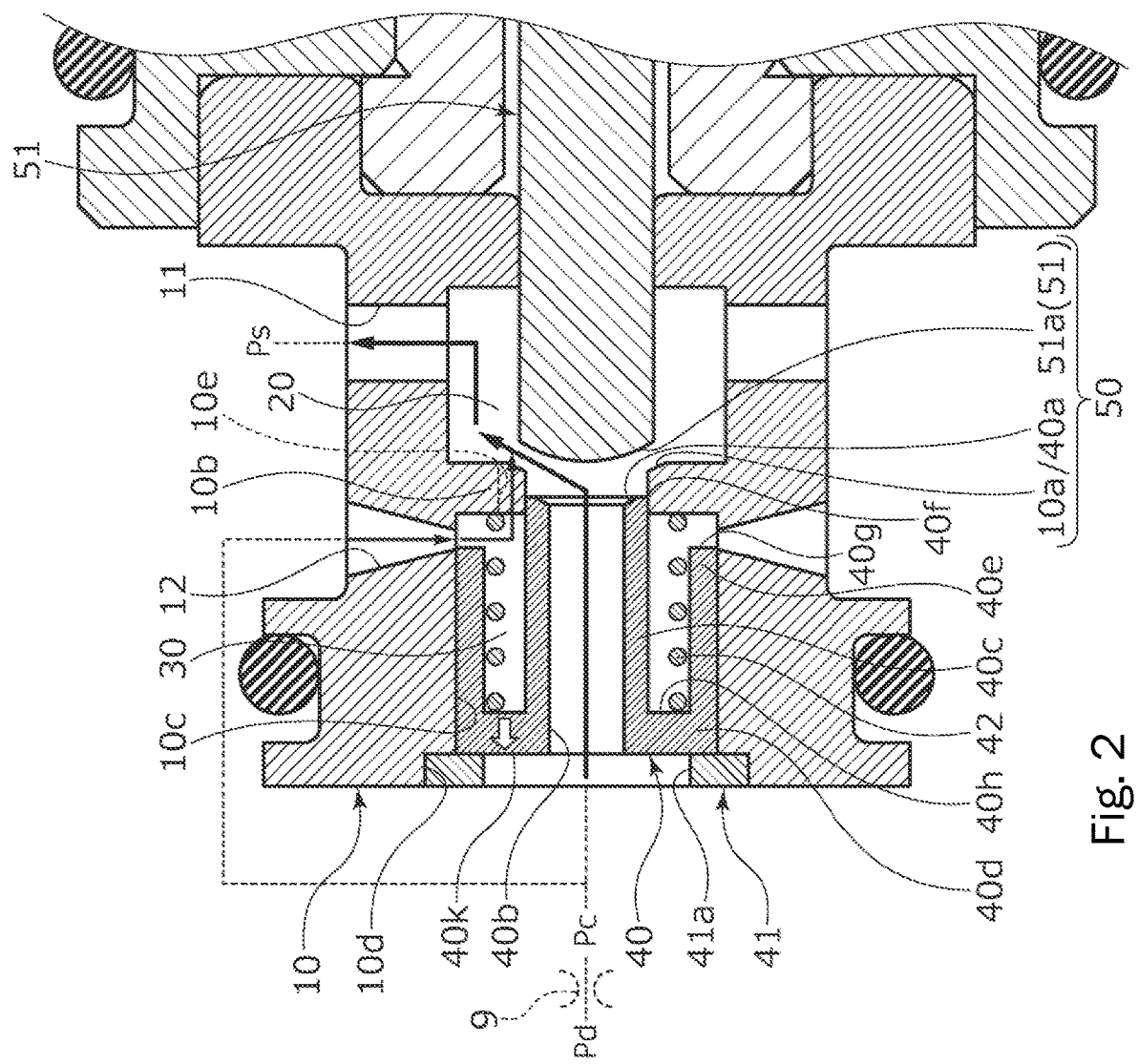
FIG. 2 is an enlarged cross-sectional view of FIG. 1.

Here, the movable body 40 will be described. As shown in FIG. 2, the movable body 40 includes a base portion 40c, a flange portion 40d, and an extension portion 40e as a closing portion and has a flanged double-cylindrical shape. The base portion 40c has a cylindrical shape in which a through-hole 40b penetrating therethrough in the axial direction is formed. The flange portion 40d extends from an outer peripheral surface of an axially left end portion of the base portion 40c to a radially outer side and has an annular plate shape. The extension portion 40e extends from a radially outer portion of the flange portion 40d to the right in the axial direction and has a cylindrical shape.

The base portion 40c is inserted into a radially inner side of the annular protrusion 10b of the valve housing 10, and an outer peripheral surface of the base portion 40c is slidable on an inner peripheral surface of the annular protrusion 10b. In addition, the second valve seat 40a having a tilted shape in a cross-sectional view is formed at an axially right end portion of the base portion 40c. A flat surface 40f having an annular shape and the second valve seat 40a that is continuous from a radially inner side of the flat surface 40f and that is gradually reduced in diameter toward the left in the axial direction are formed from the radially outer side to the radially inner side. Namely, the second valve seat 40a is formed of a tapered surface that is a tilted surface having a linear shape in a cross-sectional view and extending in the circumferential direction.

Outer peripheral surfaces of the flange portion 40d and the extension portion 40e are slidable on an inner peripheral surface of the recessed portion 10c of the valve housing 10. Incidentally, the outer peripheral surfaces of the flange portion 40d and the extension portion 40e and the inner peripheral surface of the recessed portion 10c are slightly separated from each other in the radial direction to form a very small gap therebetween, and the outer peripheral surface of the base portion 40c and the inner peripheral surface of the annular protrusion 10b are slightly separated from each other in the radial direction to form a very small gap therebetween. As described above, since the very small gaps are formed, the movable body 40 is smoothly slidable relative to the valve housing 10 in the axial direction. In addition, the outer peripheral surfaces of the flange portion 40d and the extension portion 40e form a seal portion as a clearance seal, together with the inner peripheral surface of the recessed portion 10c.

In addition, the movable body 40 is urged in a direction away from the CS valve body 51, namely, to the left in the axial direction by a coil spring 42 as an urging member disposed in the space 30. In detail, the coil spring 42 is internally fitted to the movable body 40 along the extension portion 40e of the movable body 40, and an axially right end of the coil spring 42 is in contact with a bottom surface of the recessed portion 10c, namely, a side surface on an axially left side of the annular protrusion 10b. In addition, an axially left end of the coil spring 42 is in contact with an inner surface 40h on an axially right side of the flange portion 40d of the movable body 40. Incidentally, the coil spring 42 is a compression spring.

Incidentally, in the movable body 40, the inner surface 40h on the axially right side of the flange portion 40d and an axially right end surface 40g of the extension portion 40e that face the space 30 form a pressure-receiving surface that constantly receives a secondary pressure.

In addition, the movable body 40 is urged to the left in the axial direction by an urging force of the coil spring 42. An axially left end surface 40k of the movable body 40 comes into contact with a side surface on an axially right side of the stopper 41, so that the movement of the movable body 40 to the left in the axial direction is restricted (refer to FIGS. 2 and 3). At this time, the axially right end portion of the base portion 40c is disposed on the radially inner side of the annular protrusion 10b.

As described above, inside the valve housing 10, the through-hole 41a of the stopper 41, the through-hole 40b of the movable body 40, the valve chamber 20, and the Ps port 11 form a first Pc-Ps flow passage (refer to solid arrows in FIG. 2) that provides communication between the control chamber and the suction chamber of the variable displacement compressor.

In addition, a communication passage 10e is formed in the inner peripheral surface of the annular protrusion 10b of the valve housing 10 by a groove extending in the axial direction. In addition, the communication passage 10e provides communication between the space 30 and the valve chamber 20. Namely, the fluid of a primary pressure is allowed to flow to the space 30 through the second Pc port 12, and the fluid of the secondary pressure is allowed to flow to the space 30 through the communication passage 10e. Accordingly, inside the valve housing 10, the second Pc port 12, the space 30, the communication passage 10e, the valve chamber 20, and the Ps port 11 form a second Pc-Ps flow passage (refer to solid arrows in FIG. 2) that provides communication between the control chamber and the suction chamber of the variable displacement compressor.

Incidentally, in the first embodiment, the second Pc port 12 is formed in a tapered nozzle shape that the flow passage cross-sectional area tends to decrease toward the downstream side (dA<0). In addition, the flow passage cross-sectional area of the second Pc port 12 continuously decreases toward the downstream side.

Here, a change in the flow speed and the pressure of the fluid passing through the second Pc port 12 will be described. A relational equation of cross-sectional area and pressure for the influence of an area change on an isentropic flow is shown below.

$$\frac{dp}{p} = -\frac{\gamma M^2}{M^2 - 1} \frac{dA}{A} \qquad \text{[Equation 1]}$$

p: pressure
γ: specific heat ratio
M: Mach number
A: area

When the fluid passing through the second Pc port 12 flows at a subsonic speed (M<1), based on the relational equation of cross-sectional area and pressure, the fluid passing through the second Pc port 12 increases in flow speed. In addition, the pressure of the fluid decreases. For this reason, a pressure Pc' of the fluid in the space 30 that flows from the second Pc port 12 is smaller than the control pressure Pc of the control fluid in the through-hole 41a of the stopper 41 (Pc'<Pc).

Next, an opening and closing mechanism of the CS valve 50 will be described. As shown in FIG. 2, in a non-energized state of the capacity control valve V1, the CS valve body 51 is pressed to the right in the axial direction by an urging force of the coil spring 85 (refer to FIG. 1), so that the CS valve 50 is fully opened.

Figure 3:
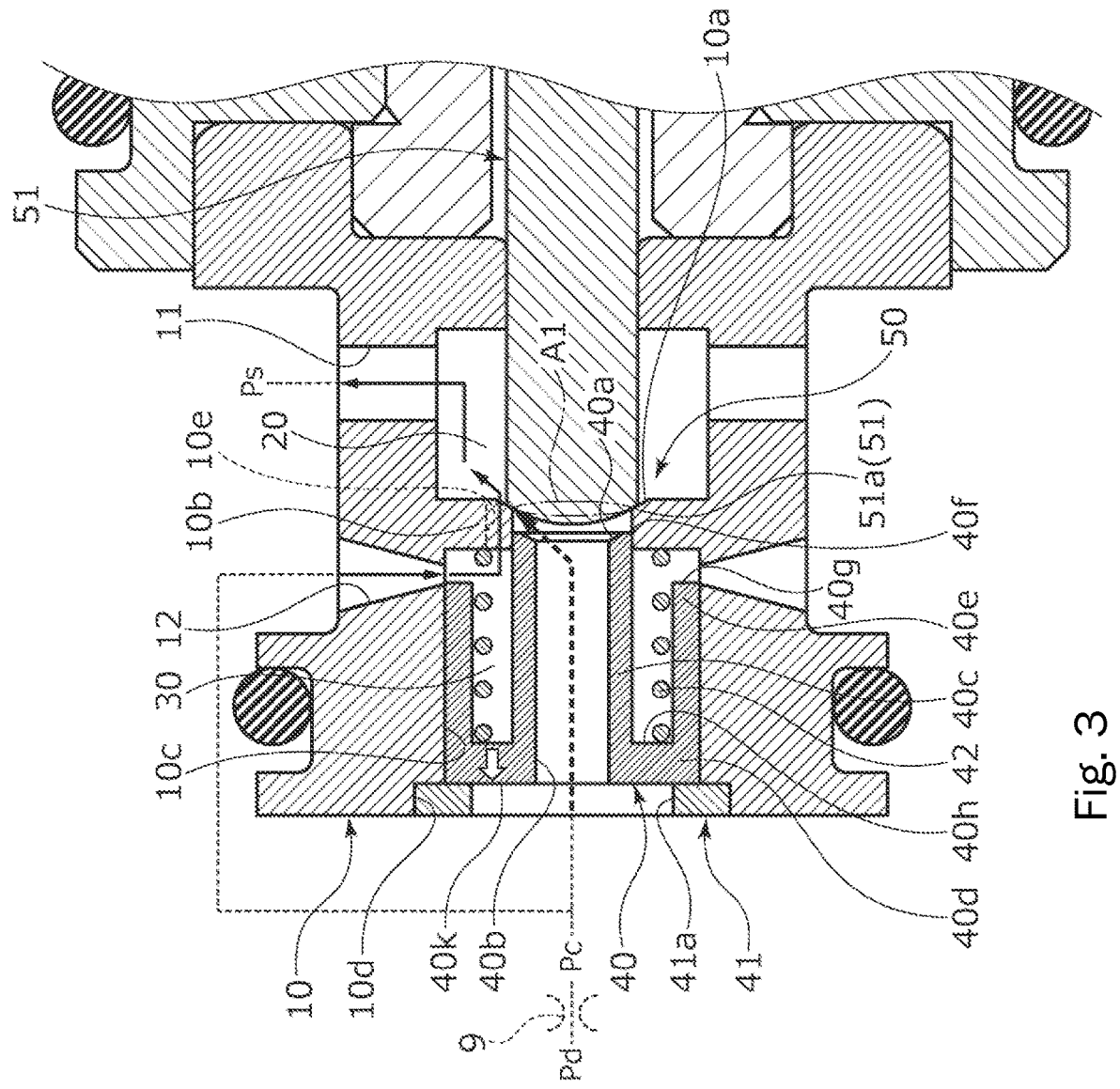
FIG. 3 is an enlarged cross-sectional view showing a state where a CS valve body is seated on a first valve seat and the CS valve is closed in an energized state (maximum energization) of the capacity control valve in the first embodiment.

In addition, as shown in FIG. 3, in an energized state (maximum energized state) of the capacity control valve V1, the CS valve body 51 is moved to the left in the axial direction against the urging force of the coil spring 85 (refer to FIG. 1) by a driving force of the solenoid 80, and the contact portion 51a of the CS valve body 51 is seated on the first valve seat 10a, so that the CS valve 50 is closed.

As shown in FIGS. 2 and 3, in a state where a differential pressure between the primary pressure and the secondary pressure which acts on the movable body 40 in the axial direction is small, the movable body 40 receives an urging force from the coil spring 42 in the direction away from the CS valve body 51 (shown by white arrows in FIGS. 2 and 3) and moves to the left in the axial direction. In addition, the axially left end surface 40k comes into contact with the stopper 41, so that the movement of the movable body 40 is restricted. In detail, the primary pressure mainly acts on the axially left end surface 40k of the movable body 40, and a differential pressure between the primary pressure and the secondary pressure acts on the inner surface 40h on the axially right side of the flange portion 40d, on the axially right end surface 40g of the extension portion 40e, and on the second valve seat 40a and the flat surface 40f at an axially right end of the base portion 40c. At this time, the axially right end surface 40g of the extension portion 40e of the movable body 40 is disposed on an axially left side of an opening on a space 30 side of the second Pc port 12, so that the second Pc port 12 is fully opened.

On the other hand, in a state where a differential pressure acting on the movable body 40 in the axial direction is large (for example, a state where the primary pressure is high), when a force acting on the movable body 40 due to the differential pressure is larger than the urging force of the coil spring 42, the coil spring 42 is contracted. In addition, the movable body 40 moves to the right in the axial direction, which is a direction toward the CS valve body 51, and the axially right end surface 40g of the extension portion 40e comes into contact with the bottom surface of the recessed portion 10c of the valve housing 10, so that the movement of the movable body 40 is restricted (refer to FIG. 4). At this time, the second Pc port 12 is closed by the seal portion as a clearance seal formed of the outer peripheral surface of an axially right end portion of the extension portion 40e of the movable body 40 and the inner peripheral surface of the recessed portion 10c.

As described above, the movable body 40 is moved in the axial direction by a balance between the differential pressure acting on the movable body 40 in the axial direction and the urging force of the coil spring 42. Namely, the movable body 40 operates independently of the CS valve body 51 that is moved by a driving force of the solenoid 80.

Figure 4:
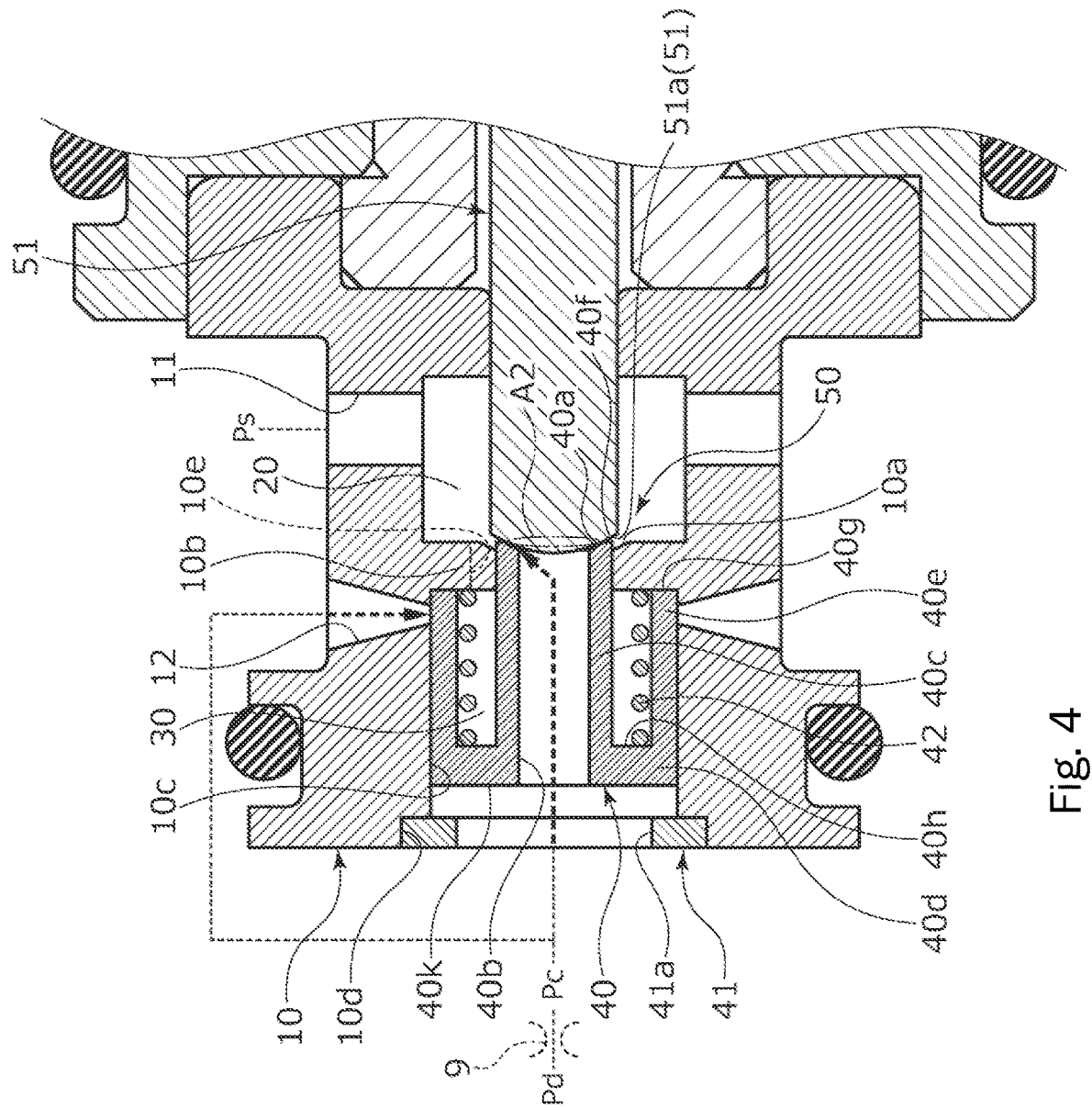
FIG. 4 is an enlarged cross-sectional view showing a state where the CS valve body is seated on a second valve seat of a movable body that has been moved by a differential pressure, and the CS valve is closed in an energized state of the capacity control valve in the first embodiment.
Figure 5:
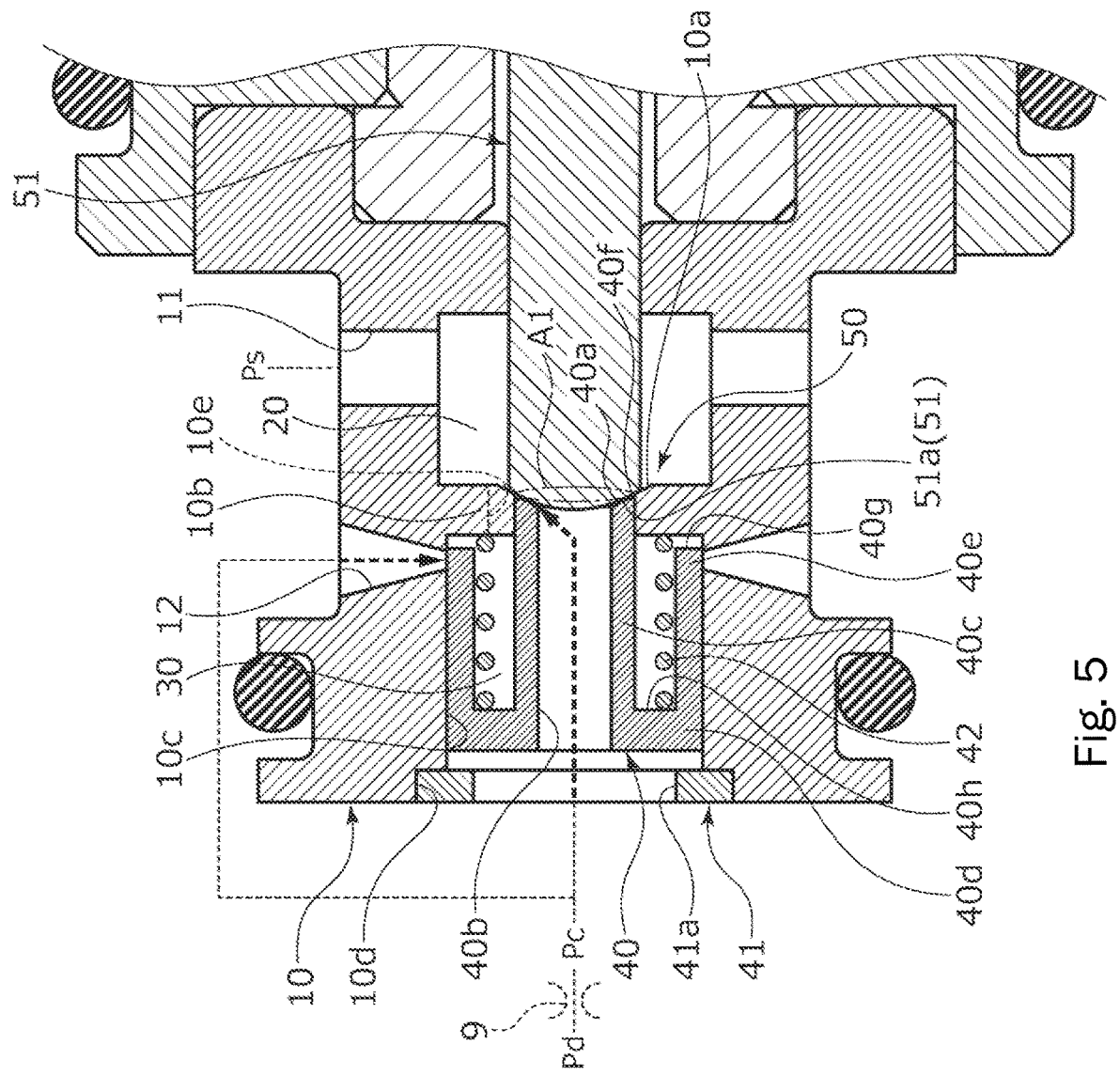
FIG. 5 is an enlarged cross-sectional view showing a state where the CS valve body further moves from the state of FIG. 4, the CS valve body is seated on the first valve seat, and the CS valve is closed in an energized state of the capacity control valve in the first embodiment.

In addition, as shown in FIG. 4, in a state where the axially right end surface 40g of the extension portion 40e of the movable body 40 is in contact with the bottom surface of the recessed portion 10c of the valve housing 10, the movable body 40 is disposed at an axial position at which the flat surface 40f at the axially right end of the base portion 40c is substantially flush with the side surface on the axially right side of the annular protrusion 10b in the radial direction on the radially inner side of the first valve seat 10a. Accordingly, when the capacity control valve V1 is energized and closed, the contact portion 51a of the CS valve body 51 can be seated on the second valve seat 40a with a stroke smaller than a stroke required for the contact portion 51a to be seated on the first valve seat 10a (refer to FIG. 3), and the CS valve 50 can be closed.

Further, since the second valve seat 40a is disposed on the radially inner side of the first valve seat 10a and is formed with a small diameter, a pressure-receiving area A2 in a state where the contact portion 51a of the CS valve body 51 is seated on the second valve seat 40a (refer to FIG. 4) can be made smaller than a pressure-receiving area A1 in a state where the contact portion 51a of the CS valve body 51 is seated on the first valve seat 10a (refer to FIG. 5) (A1>A2). Namely, a valve diameter of the second valve seat 40a is small, and a drag force that the primary pressure in the through-hole 40b of the movable body 40 acts on the contact portion 51a of the CS valve body 51 to the right in the axial direction is small, so that the CS valve 50 can be closed with a small driving force of the solenoid 80.

In addition, until the CS valve body 51 is further moved to the left in the axial direction from the state shown in FIG. 4, and the contact portion 51a of the CS valve body 51 is seated on the first valve seat 10a, a drag force that the CS valve body 51 receives from the primary pressure in the through-hole 40b of the movable body 40 is based on the pressure-receiving area A2 described above which is small, so that the driving force of the solenoid 80 required for closing the CS valve 50 can be reduced. Incidentally, in the state shown in FIG. 5, since the contact portion 51a of the CS valve body 51 is seated on the first valve seat 10a, even when the movable body 40 has moved to the left in the axial direction due to a change in the differential pressure acting on the movable body 40 in the axial direction, the closing of the CS valve 50 can be maintained.

At this time, as the CS valve body 51 moves, the movable body 40 is pressed to the left in the axial direction, and the axially right end surface 40g of the extension portion 40e separates from the bottom surface of the recessed portion 10c of the valve housing 10 to the left in the axial direction, but since the axially right end surface 40g of the extension portion 40e is disposed an axially right side of the opening on the space 30 side of the second Pc port 12, a state where the second Pc port 12 is closed is maintained, and a leakage of the fluid is prevented.

In addition, in the movable body 40, since the inner surface 40h on the axially right side of the flange portion 40d and the axially right end surface 40g of the extension portion 40e that face the space 30 form a pressure-receiving surface that constantly receives the secondary pressure, a differential pressure between the primary pressure and the secondary pressure can constantly act on the movable body 40, so that responsiveness to the differential pressure can be improved.

In addition, since the movable body 40 is urged in the direction away from the CS valve body 51 by the coil spring 42, when the differential pressure acting on the movable body 40 is small, the movable body 40 can be reliably separated from the CS valve body 51.

In addition, since the fluid of the primary pressure and the fluid of the secondary pressure are allowed to flow to the space 30, the primary pressure is supplied to the space 30 through the second Pc port 12, in addition to the secondary pressure that is supplied from the valve chamber 20 that is the secondary pressure side, through the communication passage 10e. For this reason, the differential pressure acting on the movable body 40 can be adjusted according to the primary pressure, and the responsiveness of the movable body 40 can be improved.

In addition, since the communication passage 10e is formed between the space 30 and the valve chamber 20, when the movable body 40 moves to the right in the axial direction, the fluid can be moved from the space 30 to the valve chamber 20 through the communication passage 10e, so that the movable body 40 can smoothly move.

In addition, the second Pc port 12 is a tapered nozzle that is reduced in flow passage cross-sectional area toward the downstream side, and when the fluid passing through the second Pc port 12 flows at a subsonic speed, the fluid passing through the second Pc port 12 from the primary pressure side increases in flow speed, and the pressure of the fluid supplied to the space 30 decreases, so that the differential pressure acting on the movable body 40 is adjusted to increase. Accordingly, the movable body 40 can easily approach the CS valve body 51.

In addition, the coil spring 42 is disposed in the space 30, the movable body 40 and the CS valve body 51 can be independently operated, and the responsiveness of the movable body 40 can be improved.

In addition, as shown in FIG. 2, in a non-energized state, when the differential pressure is small, both the CS valve 50 and the second Pc port 12 are fully opened, so that the flow rate of the fluid can be increased through both the first Pc-Ps flow passage and the second Pc-Ps flow passage.

In addition, since the capacity control valve V1 has a structure where the movable body 40 and the coil spring 42 are inserted into the recessed portion 10c from the axially left end of the valve housing 10 and then the stopper 41 is press-fitted and fixed, the capacity control valve V1 is easy to assemble.

Second Embodiment

A capacity control valve as a valve according to a second embodiment of the present invention will be described with reference to FIG. 6. Incidentally, a description of duplicated configurations that are the same as the configurations of the first embodiment will be omitted.

Figure 6:
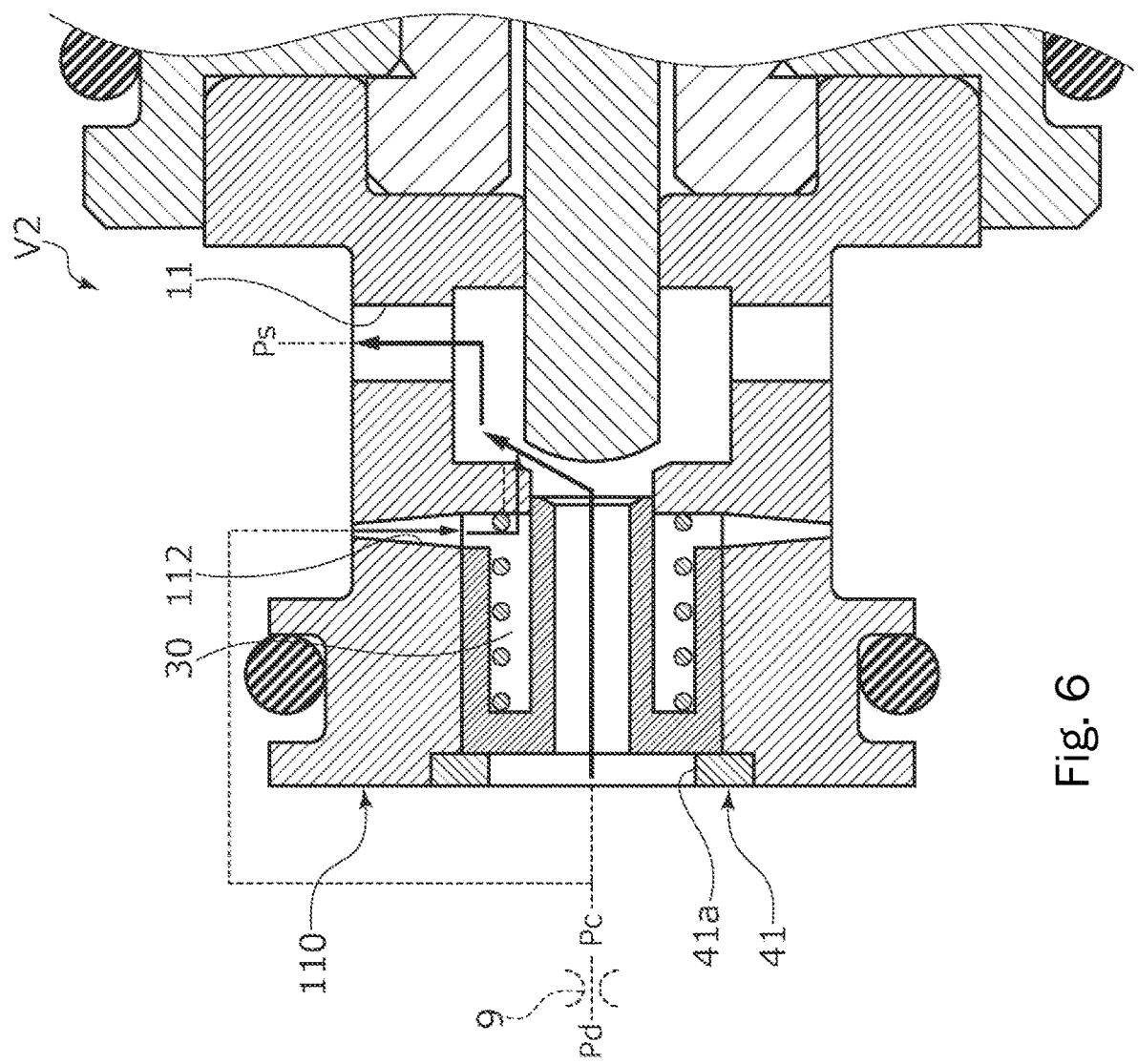
FIG. 6 is a cross-sectional view showing a state where a CS valve is opened in a non-energized state of a capacity control valve as a valve according to a second embodiment of the present invention.

As shown in FIG. 6, in a capacity control valve V2 of the second embodiment, a Pc port 112 as a second primary pressure port is formed in a valve housing 110. The Pc port 112 has a divergent nozzle shape that is increased in flow passage cross-sectional area toward a downstream side (dA>0).

When the fluid passing through the Pc port 112 flows at a supersonic speed (M>1), based on the relational equation of cross-sectional area and pressure in the first embodiment, the fluid passing through the Pc port 112 increases in flow speed and decreases in pressure. For this reason, the pressure Pc' of the fluid in the space 30 that flows from the Pc port 112 is smaller than the control pressure Pc of the control fluid in the through-hole 41a of the stopper 41 (Pc'<Pc). Accordingly, a differential pressure acting on the movable body 40 can be adjusted to increase, and the movable body 40 can easily approach the CS valve body 51.

The embodiments of the present invention have been described above with reference to the drawings; however, the specific configurations are not limited to the embodiments, and the present invention also includes changes or additions that are made without departing from the scope of the present invention.

For example, in the first and second embodiments, a mode has been described in which in a state where the movable body 40 has moved to the right in the axial direction, the movable body 40 is disposed at the axial position at which the flat surface 40f at the axially right end of the base portion 40c is substantially flush with the side surface on the axially right side of the annular protrusion 10b in the radial direction on the radially inner side of the first valve seat 10a, but the present invention is not limited to the mode, and in a state where the movable body 40 has moved to the right in the axial direction, the contact portion 51a of the CS valve body 51 may be able to be seated on the second valve seat 40a prior to being seated on the first valve seat 10a.

In addition, in the first and second embodiments, a mode has been described in which the second Pc ports 12 and 112 that provide communication between the primary pressure side and the space 30 are formed in a tapered nozzle shape and a divergent nozzle shape, respectively, in which the flow passage cross-sectional area continuously increases and decreases, but the present invention is not limited to the mode, and the flow passage cross-sectional area may increase or decrease in a stepwise manner. In addition, the flow passage cross-sectional area of the Pc port that provides communication between the primary pressure side and the space 30 may be constant.

In addition, the fluid of the primary pressure may not be able to flow to the space 30.

In addition, the communication passage 10e is not limited to a groove and may be formed of a through-hole penetrating the annular protrusion 10b in the axial direction.

In addition, the contact portion 51a of the CS valve body 51 may not be formed in a curved shape in a cross-sectional view and, for example, may be formed in a stepped shape in which the contact portion 51a can come into contact with each of the first valve seat 10a and the second valve seat 40a.

In addition, a tapered surface forming each of the first valve seat 10a and the second valve seat 40a is not limited to having a linear shape and may have an arc shape.

In addition, in the capacity control valves V1 and V2 of the first and second embodiments, the CS valve 50 has been described as an example, but the present invention is not limited to the CS valve 50, and a DC valve may be adopted that opens and closes a flow passage between a Pd port as a primary pressure port and the Pc port as a secondary pressure port.

REFERENCE SIGNS LIST

9 Fixed orifice
10 Valve housing
10a First valve seat (valve seat)
10b Annular protrusion
10c Recessed portion
10d Step portion
10e Communication passage
11 Ps port (secondary pressure port)
12 Second Pc port (second primary pressure port)
20 Valve chamber
30 Space
40 Movable body
40a Second valve seat (valve seat)
40b Through-hole
40c Base portion
40d Flange portion
40e Extension portion (closing portion)
40f Flat surface
40g Axially right end surface (pressure-receiving surface that constantly receives secondary pressure)
40h Side surface (pressure-receiving surface that constantly receives secondary pressure)
40k Axially left end surface
41 Stopper
41a Through-hole (primary pressure port, first Pc port)
42 Coil spring (urging member)
50 CS valve
51 CS valve body (valve body)
51a Contact portion
80 Solenoid
85 Coil spring (spring)
110 Valve housing
112 Second Pc port (second primary pressure port)
V1, V2 Capacity control valve (valve)

The invention claimed is:

1. A valve, comprising:
a valve housing provided with a primary pressure port and a secondary pressure port;
a valve body configured to be driven by a drive source; and
a valve seat on which the valve body is seated,
wherein the valve seat includes a first valve seat and a second valve seat disposed on a radially inner side of the first valve seat, the second valve seat being configured for moving in a direction toward the valve body due to a differential pressure between a primary pressure and a secondary pressure.

2. The valve according to claim 1,
wherein a movable body in which the second valve seat is formed has a pressure-receiving surface that constantly receives the secondary pressure.

3. The valve according to claim 2,
wherein the movable body is urged in a direction away from the valve body by an urging member.

4. The valve according to claim 2,
wherein a fluid of the primary pressure and a fluid of the secondary pressure are allowed to flow to a space partially defined by the pressure-receiving surface.

5. The valve according to claim 4,
wherein the urging member is disposed in the space.

6. The valve according to claim 4,
wherein the movable body includes a closing portion configured for closing a second primary pressure port that allows the fluid of the primary pressure to flow to the space when the valve body is seated on the second valve seat to close the valve.

7. The valve according to claim 6,
wherein the second primary pressure port is formed by a tapered nozzle that is reduced in flow passage cross-sectional area toward a downstream side.

8. The valve according to claim 6,
wherein the second primary pressure port is formed by a divergent nozzle that is increased in flow passage cross-sectional area toward a downstream side.

9. The valve according to claim 3,
wherein a fluid of the primary pressure and a fluid of the secondary pressure are allowed to flow to a space partially defined by the pressure-receiving surface.

10. The valve according to claim 9,
wherein the urging member is disposed in the space.

11. The valve according to claim 5,
wherein the movable body includes a closing portion configured for closing a second primary pressure port that allows the fluid of the primary pressure to flow to the space when the valve body is seated on the second valve seat to close the valve.

12. The valve according to claim 11,
wherein the second primary pressure port is formed by a tapered nozzle that is reduced in flow passage cross-sectional area toward a downstream side.

13. The valve according to claim 11,
wherein the second primary pressure port is formed by a divergent nozzle that is increased in flow passage cross-sectional area toward a downstream side.

\* \* \* \* \*